(12) United States Patent
Wen (10) Patent No.: US 12,178,254 B2
(45) Date of Patent: Dec. 31, 2024

(54) ATOMIZER AND ELECTRONIC ATOMIZATION DEVICE

(71) Applicant: SHENZHEN SMOORE TECHNOLOGY LIMITED, Shenzhen (CN)

(72) Inventor: Zhihua Wen, Shenzhen (CN)

(73) Assignee: SHENZHEN SMOORE TECHNOLOGY LIMITED, Shenzhen (CN)

(*) Notice: Subject to any disclaimer, the term of this patent is extended or adjusted under 35 U.S.C. 154(b) by 749 days.

(21) Appl. No.: 17/344,024

(22) Filed: Jun. 10, 2021

(65) Prior Publication Data
US 2021/0386121 A1     Dec. 16, 2021

(30) Foreign Application Priority Data

Jun. 15, 2020 (CN) .......................... 202010543159.3
Jun. 15, 2020 (CN) .......................... 202010544396.1

(51) Int. Cl.
   *A24F 40/485*     (2020.01)
   *F16K 15/18*     (2006.01)
   *A24F 40/10*     (2020.01)

(52) U.S. Cl.
   CPC ............ *A24F 40/485* (2020.01); *F16K 15/18* (2013.01); *A24F 40/10* (2020.01)

(58) Field of Classification Search
None
See application file for complete search history.

(56) References Cited

U.S. PATENT DOCUMENTS

| | | |
|---|---|---|
| 9,538,790 B2 | 1/2017 | Li et al. |
| 2015/0201674 A1 | 7/2015 | Dooly et al. |
| 2016/0183596 A1 | 6/2016 | Rado |
| 2016/0235120 A1 | 8/2016 | Liu |

(Continued)

FOREIGN PATENT DOCUMENTS

| | | |
|---|---|---|
| CN | 203327951 U | 12/2013 |
| CN | 203467676 U | 3/2014 |

(Continued)

OTHER PUBLICATIONS

Extended European Search Report issued in European Patent Application No. 21179501.8, mailed on Nov. 4, 2021, 7 pages.

(Continued)

*Primary Examiner* — Christopher M Rodd
*Assistant Examiner* — Daniel Edward Vakili
(74) *Attorney, Agent, or Firm* — Dorsey & Whitney LLP (57) ABSTRACT

The atomizer is applied to an electronic atomization device. The atomizer includes an airflow channel, an atomizing core, a base, and a one-way valve comprising a baffle that is connected to the base. The baffle has a closed state and an open state. Under normal conditions, the baffle is in the closed state, the baffle covers the air inlet. Upon inhaling at the air outlet, the baffle is in the open state to allow airflow to pass through. The base and/or the baffle is provided with a cavity. While the baffle is in the closed state, surfaces on which the base and the baffle press against each other are contact surfaces, at least a part of the cavity is located on the contact surfaces, the cavity communicates with the air inlet to form a stress weak point.

21 Claims, 9 Drawing Sheets

(56) References Cited

U.S. PATENT DOCUMENTS

| | | | | |
|---|---|---|---|---|
| 2018/0243520 A1* | 8/2018 | Johnson | | A61M 15/00 |
| 2022/0202098 A1* | 6/2022 | Illidge | | A24F 40/485 |

FOREIGN PATENT DOCUMENTS

| | | | |
|---|---|---|---|
| CN | 103879279 | A | 6/2014 |
| CN | 204120221 | U | 1/2015 |
| CN | 204409583 | U | 6/2015 |
| CN | 105768233 | A | 7/2016 |
| CN | 205978669 | U | 2/2017 |
| CN | 107072307 | A | 8/2017 |
| CN | 206443204 | U | 8/2017 |
| CN | 206491336 | U | 9/2017 |
| CN | 206620837 | U | 11/2017 |
| CN | 206791622 | U | 12/2017 |
| CN | 107802037 | A | 3/2018 |
| CN | 207236081 | U | 4/2018 |
| CN | 208242854 | U | 12/2018 |
| CN | 208336350 | U | 1/2019 |
| CN | 106061300 | B | 3/2019 |
| CN | 109953378 | A | 7/2019 |
| CN | 209251755 | U | 8/2019 |
| CN | 209403585 | U | 9/2019 |
| CN | 110495648 | A | 11/2019 |
| CN | 111772237 | A | 10/2020 |
| CN | 111772238 | A | 10/2020 |
| CN | 211746967 | U | 10/2020 |
| CN | 212545545 | U | 2/2021 |
| CN | 212545546 | U | 2/2021 |
| JP | 2005282912 | A | 10/2005 |
| WO | 2015042796 | A1 | 4/2015 |
| WO | 2015176254 | A1 | 11/2015 |
| WO | 2016065532 | A1 | 5/2016 |
| WO | 2019144308 | A1 | 8/2019 |

OTHER PUBLICATIONS

International Search Report and Written Opinion issued in International Application No. PCT/CN2020/096141, mailed on Mar. 18, 2021, 16 pages including 5 pages of English translation.

Communication Pursuant to Article 94(3) EPC for European Application No. 21179501.8 mailed Jun. 29, 2023.

First Office Action for Chinese Patent Application No. 202010544396.1 mailed Sep. 25, 2024.

Gong , et al., "Investigation into Factors Influencing Atomization Temperature in Vaping", doi : 10.16472/j.chinatobacco.2016.131, 2016, pp. 49-54.

Gong , et al., "Investigation into Factors Influencing Atomization Temperature in Vaping", Acta Tabacaria Sinica 2017, vol. 23, No. 3. doi : 10.16472/j.chinatobacco.2016.131, 2017, pp. 49-55.

First Office Action for Chinese Application No. 202010543159.3 mailed Nov. 15, 2024.

* cited by examiner

ATOMIZER AND ELECTRONIC ATOMIZATION DEVICE

CROSS REFERENCE TO RELATED APPLICATIONS

This application claims priority to Chinese Patent Application No. 202010543159.3, filed on Jun. 15, 2020, entitled "ATOMIZER AND ELECTRONIC ATOMIZATION DEVICE", and Chinese Patent Application No. 202010544396.1, filed on Jun. 15, 2020, entitled "ATOMIZER AND ELECTRONIC ATOMIZATION DEVICE", and the entire contents of which are incorporated herein by reference.

TECHNICAL FIELD

The present disclosure relates to the field of electronic atomization technology, and in particular, to an atomizer and an electronic atomization device including the same.

BACKGROUND

There are dozens of carcinogens in the smoke of burning tobacco. For example, tar can cause great damage to human health, and the smoke diffused in the air forms second-hand smoke, which can also cause harm to the health of the surrounding people after the inhalation thereof. Hence, smoking is explicitly prohibited in most public places. However, the electronic atomization device has an appearance and a taste similar to those of ordinary cigarettes, but usually does not contain tar, suspended particles and other harmful components in ordinary cigarettes. Therefore, the electronic atomization devices are generally used as a substitute for cigarettes.

The electronic atomization device includes an atomizer and a power supply assembly. The power supply assembly is used to supply electric energy to the atomizer. The atomizer converts the electric energy into thermal energy. Oil in the atomizer absorbs heat and then is atomized to form smoke that can be inhaled by a user. However, for the conventional electronic atomization device, in order to prevent the oil in a liquid storage cavity of the atomizer and liquid condensate formed after the cooling of the smoke from leaking from the atomizer, and to avoid the leaked oil and liquid condensate from corroding the power supply assembly, a valve is usually disposed in the atomizer to prevent the leakage of the oil and liquid condensate. However, the resistance to valve opening is relatively large, resulting in a poor user experience where the users have difficulty in inhalation.

SUMMARY

According to various embodiments of the present disclosure, an atomizer and an electronic atomization device are provided.

An atomizer, including:
an airflow channel, including an air inlet and an air outlet;
an atomizing core, at least a part of the atomizing core being located in the airflow channel;
a base, wherein the air inlet extends through the base; and
a one-way valve, including a baffle elastically connected to the base; wherein the baffle has a closed state and an open state; under normal conditions, the baffle is in the closed state, and the baffle covers the air inlet; upon inhaling at the air outlet, the baffle is in the open state to allow airflow to pass through;
the base and/or the baffle is provided with a cavity; while the baffle is in the closed state, surfaces on which the base and the baffle press against each other are contact surfaces, at least a part of the cavity is located on the contact surfaces, and the cavity is in communication with the air inlet to form a stress weak point.

In one of the embodiments, the cavity cuts off the contact surface of the base and/or the contact surface of the baffle to prevent the contact surfaces from being closed along a circumference of the air inlet to form a continuous ring.

In one of the embodiments, a surface of the base facing the atomizing core is recessed to form an annular groove, such that a part of the base forms a support cylinder, the air inlet extends through the support cylinder, the contact surface of the base is a first contact surface, the first contact surface is located in the support cylinder, and the cavity is formed on the first contact surface.

In one of the embodiments, the support cylinder further has a first separation surface and a second separation surface, the first contact surface is connected between the first separation surface and the second separation surface, the first separation surface and the second separation surface together form a predetermined taper angle and are both located on a side of the first contact surface away from the baffle; while the baffle covers the air inlet, the first contact surface is pressed against the baffle, and both the first separation surface and the second separation surface are spaced apart from the baffle.

In one of the embodiments, the taper angle ranges from 20° to 135°, and the first contact surface has a width ranging from 0.2 mm to 1 mm.

In one of the embodiments, the cavity extends through both the first separation surface and the second separation surface to be in communication with the annular groove and the air inlet.

In one of the embodiments, the contact surface is a rough surface and has a roughness greater than or equal to 1.6 μm.

In one of the embodiments, the cavity has a depth dimension of 0.01 mm to 0.5 mm.

In one of the embodiments, the cavity has a cross-sectional profile of circular, polygonal, or elliptical; and the contact surfaces are circular, racetrack-shaped, or rectangular.

In one of the embodiments, there are a plurality of cavities, and the plurality of cavities are distributed at intervals along circumferential direction of the air inlet.

In one of the embodiments, the one-way valve further includes a fixed end and an elastic arm, the elastic arm is connected between the fixed end and the baffle, and the fixed end is fixedly connected to the base, and the baffle is capable of swinging relative to the fixed end following the elastic arm.

In one of the embodiments, the elastic arm has a first curved surface and a second curved surface having opposite bending directions, and a distance between the first curved surface and the second curved surface decreases from an edge part of the elastic arm to a middle part of the elastic arm.

In one of the embodiments, a thickness of the elastic arm is the smallest relative to the fixed end and the baffle.

In one of the embodiments, the elastic arm has a thickness of 0.1 mm to 0.8 mm, the elastic arm has a length of 0.02 mm to 2 mm, and the elastic arm has a width of 0.5 mm to 3 mm.

In one of the embodiments, along a width direction of the elastic arm, an edge of the elastic arm is spaced at a predetermined distance from an edge of the fixed end and an edge of the baffle, respectively.

In one of the embodiments, the fixed end is provided with a through hole extending in a thickness direction of the fixed end, and the through hole is configured for mounting of the fixed end.

In one of the embodiments, when the baffle opens the air inlet, a maximum distance between the baffle and the contact surface is 0.3 mm to 1.5 mm.

In one of the embodiments, while an air pressure difference formed on opposite sides of the baffle by the inhalation is greater than a threshold pressure, the baffle is in the open state, and the threshold pressure is 10 Pa to 100 Pa.

In one of the embodiments, the threshold pressure is 30 Pa to 70 Pa.

Since at least a part of the cavity is located on the contact surface, at a notch formed by the cavity, a part of the baffle corresponding to the cavity does not form an actual attachment relationship with the base, such that no adhesive force is formed between the part of the baffle adhered with the liquid condensate and overflowing oil and the base. Therefore, the part of the baffle corresponding to the cavity is more likely to be detached from the base than other parts of the baffle actually attached to the base, such that the part of the baffle forms a stress weak point, in turn the entire baffle is first detached from the base near the stress weak point and forms a "tear gap" with the base. When the outside air enters the "tear gap" through the air inlet, the adhesive force between the liquid condensate and the overflowing oil can be further greatly weakened. Finally, the resistance that the entire baffle overcomes to leave the base is reduced. It ensures that the baffle can be quickly detached from the base under a small air pressure difference. It prevents the feeling of being blocked or broken caused by the baffle being difficult to detach from the base due to an excessively small suction force, and ultimately improves the response sensitivity of the atomizer to the inhalation of the user.

An electronic atomization device includes a power supply assembly and the atomizer according to any one of the aforementioned embodiments, and the power supply assembly is provided with a receiving cavity capable of receiving the atomizer.

In one of the embodiments, the atomizer is detachably connected to the power supply assembly.

An atomizer, including:

- an airflow channel, including an air inlet and an air outlet;
- an atomizing core, at least a part of the atomizing core being located in the airflow channel;
- a base, wherein the air inlet extends through the base; and
- a one-way valve, including a baffle elastically connected to the base; wherein the baffle has a closed state and an open state; under normal conditions, the baffle is in the closed state, and the baffle covers the air inlet; upon inhaling at the air outlet, the baffle is in the open state to allow airflow to pass through;
- the base has an upper surface, and the baffle has a lower surface; while the baffle is in the closed state, the upper surface is opposite to the lower surface; the upper surface and/or the lower surface reduce a contact area between the baffle and the base by partially protruding or partially recessing.

In one of the embodiments, the upper surface is recessed to form an annular groove, such that a part of the base forms a support cylinder, the air inlet extends through the support cylinder, the baffle is capable of pressing against the support cylinder to cover the air inlet.

In one of the embodiments, the support cylinder has a contact surface, a first separation surface, and a second separation surface, the contact surface is connected between the first separation surface and the second separation surface, the first separation surface and the second separation surface together form a predetermined taper angle and are both located on a side of the contact surface away from the baffle; while the baffle covers the air inlet, the contact surface is pressed against the lower surface of the baffle, and both the first separation surface and the second separation surface are spaced apart from the lower surface.

In one of the embodiments, the taper angle ranges from 20° to 135°, and the contact surface has a width ranging from 0.2 mm to 1 mm.

In one of the embodiments, the contact surface is recessed to form a cavity, the first separation surface defines a part of a boundary of the air inlet, and the cavity extends through the first separation surface to be in communication with the air inlet.

In one of the embodiments, the cavity extends through the second separation surface to be in communication with the annular groove.

In one of the embodiments, the cavity has a depth dimension of 0.01 mm to 0.5 mm.

In one of the embodiments, the base includes a boss disposed on the upper surface and protruding relative to the upper surface; while the baffle covers the air inlet, a surface of the boss facing the atomizing core is a contact surface pressed against the lower surface of the baffle, the lower surface is spaced apart from a part of the upper surface where the boss is not disposed.

In one of the embodiments, the baffle includes a protruding strip disposed on the lower surface and protruding relative to the lower surface; while the baffle covers the air inlet, a part of the upper surface is a contact surface pressed against the protruding strip, and another part of the upper surface is spaced apart from the lower surface.

In one of the embodiments, surfaces of the base and the baffle that are pressed against each other are both contact surfaces, the contact surfaces are recessed to form counterbores.

In one of the embodiments, surfaces on which the base and the baffle press against each other are contact surfaces, the contact surfaces are rough surfaces and have a roughness Ra greater than or equal to 1.6 μm.

In one of the embodiments, the one-way valve further includes a fixed end and an elastic arm, the elastic arm is connected between the fixed end and the baffle, and the fixed end is fixedly connected to the base, and the baffle is capable of swinging relative to the fixed end following the elastic arm.

In one of the embodiments, the elastic arm has a first curved surface and a second curved surface having opposite bending directions, and a distance between the first curved surface and the second curved surface decreases from an edge part of the elastic arm to a middle part of the elastic arm.

In one of the embodiments, a thickness of the elastic arm is the smallest relative to the fixed end and the baffle.

In one of the embodiments, the elastic arm has a thickness of 0.1 mm to 0.8 mm, the elastic arm has a length of 0.02 mm to 2 mm, and the elastic arm has a width of 0.5 mm to 3 mm.

In one of the embodiments, along a width direction of the elastic arm, an edge of the elastic arm is spaced at a predetermined distance from an edge of the fixed end and an edge of the baffle, respectively.

In one of the embodiments, the fixed end is provided with a through hole extending in a thickness direction of the fixed end, and the through hole is configured for mounting of the fixed end.

In one of the embodiments, when the baffle opens the air inlet, a maximum distance between a part of the base that is capable of pressing against the baffle and the baffle is 0.3 mm to 1.5 mm.

In one of the embodiments, the base and/or the baffle is provided with a cavity, while the baffle is in the closed state, surfaces on which the base and the baffle press against each other are contact surfaces, at least a part of the cavity is located on the contact surface of the base and/or the contact surface of the baffle, and the cavity is in communication with the air inlet to form a stress weak point.

In one of the embodiments, the cavity cuts off the contact surface of the base and/or the contact surface of the baffle to prevent the contact surfaces from being closed along a circumferential direction of the air inlet to form a continuous ring.

In one of the embodiments, while an air pressure difference formed on opposite sides of the baffle by the inhalation is greater than a threshold pressure, the baffle is in the open state, and the threshold pressure is 10 Pa to 100 Pa.

In one of the embodiments, the threshold pressure is 30 Pa to 70 Pa.

Since the contact area between the baffle and the base is reduced by the upper surface and/or the lower surface in a partially protruding or partially recessing manner, the adhesive force generated between the base and the baffle due to liquid condensate and overflowing oil is further reduced, and the resistance that the baffle overcomes to leave the base to open the air inlet is reduced, a user enables the baffle to be in the open state by using a small air pressure difference generated by small suction force, so that the air inlet is opened for the inhalation of smoke. It prevents the feeling of being blocked or broken caused by the baffle being difficult to detach from the base due to an excessively small suction force, and ultimately improves the response sensitivity of the atomizer to the inhalation of the user.

An electronic atomization device includes a power supply assembly and the atomizer according to any one of the aforementioned embodiments, and the power supply assembly is provided with a receiving cavity capable of receiving the atomizer.

In one of the embodiments, the atomizer is detachably connected to the power supply assembly.

The above and other features of the present disclosure including various novel details of construction and combinations of parts, and other advantages, will now be more particularly described with reference to the accompanying drawings and pointed out in the claims.

BRIEF DESCRIPTION OF THE DRAWINGS

To illustrate the technical solution according to the embodiments of the present disclosure or related art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to facilitate the understanding of the present disclosure, the present disclosure will be described more fully below with reference to the relevant drawings. Preferred embodiments of the present disclosure are shown in the drawings. However, the present disclosure can be implemented in many different forms and is not limited to the embodiments described herein. On the contrary, the purpose of providing these embodiments is to make the present disclosure more thorough and comprehensive.

It should be noted that when an element is referred to as being "fixed to" another element, it can be directly on the other element or an intermediate element may also be present. When an element is considered to be "connected" to another element, it can be directly connected to the other element or an intermediate element may be present at the same time. The terms "inner", "outer", "left", "right" and similar expressions used herein are for illustrative purposes only, and do not mean that they are the only implementations.

Figure 1:
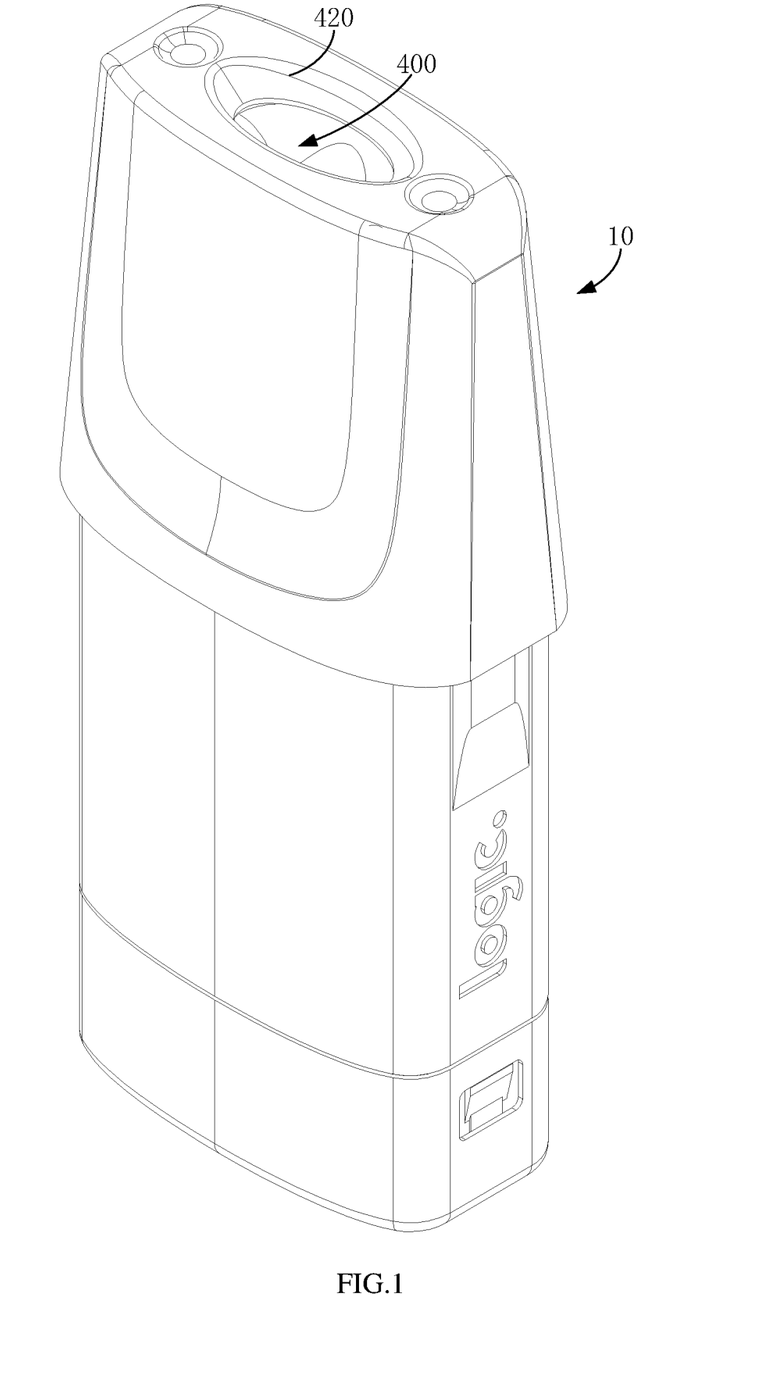
FIG. 1 is a perspective view of an atomizer according to an embodiment.
Figure 2:
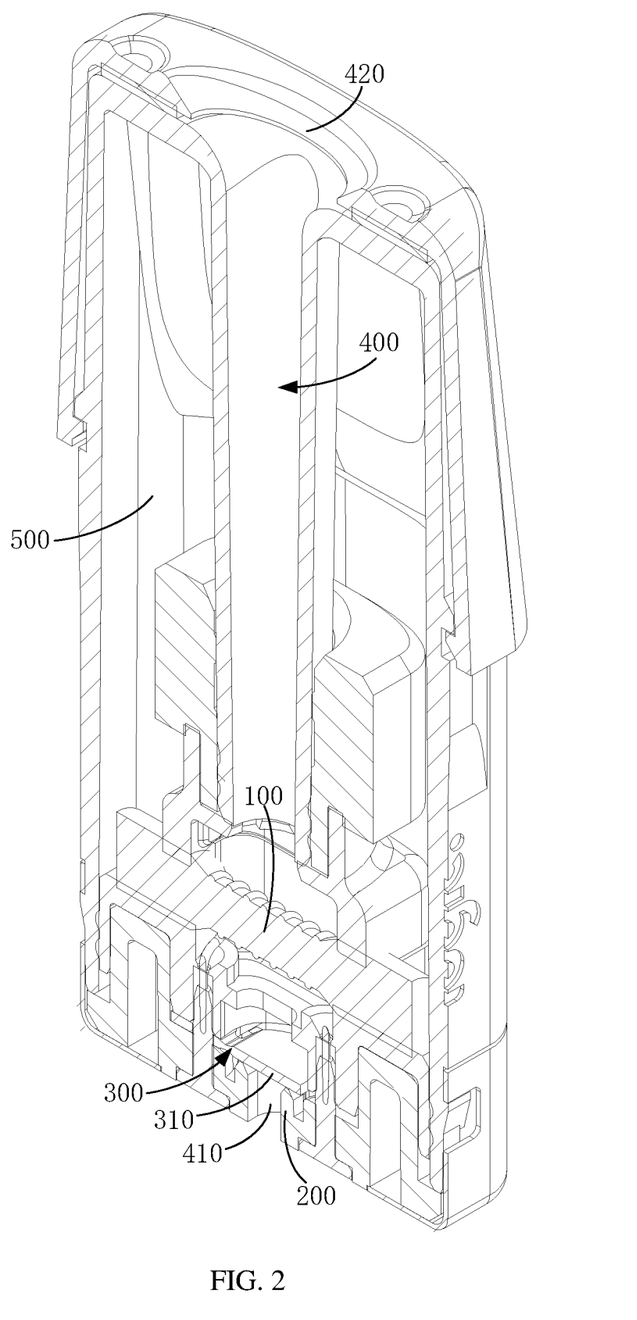
FIG. 2 is a perspective cross-sectional view of the atomizer shown in FIG. 1.

Referring to FIGS. 1 and 2, an electronic atomization device provided by an embodiment of the present disclosure includes an atomizer 10 and a power supply assembly. The power supply assembly is used to supply electric energy to the atomizer 10, and the atomizer 10 converts the electric energy into thermal energy. Oil stored in a liquid storage cavity of the atomizer 10 absorbs heat and then is atomized to form smoke that can be inhaled by a user. The power supply assembly is provided with a receiving cavity, and a part of the atomizer 10 is inserted and housed in the receiving cavity. The atomizer 10 is detachably connected to the power supply assembly. Of course, the atomizer 10 and the power supply assembly may also form a non-detachable connection.

In some embodiments, the atomizer 10 is provided with an airflow channel 400 therein that extends through a bottom surface and a top surface of the atomizer 10, an opening of the airflow channel 400 on the top surface is an air outlet 420. When a user inhales at the air outlet 420, outside air is input into the atomizer 10 from a bottom of the airflow channel 400, and smoke generated by atomization in the atomizer 10 is carried by the outside air and output from the air outlet 420 for the user to inhale. The atomizer 10 includes an atomizing core 100, a base 200, and a one-way valve 300.

Figure 3:
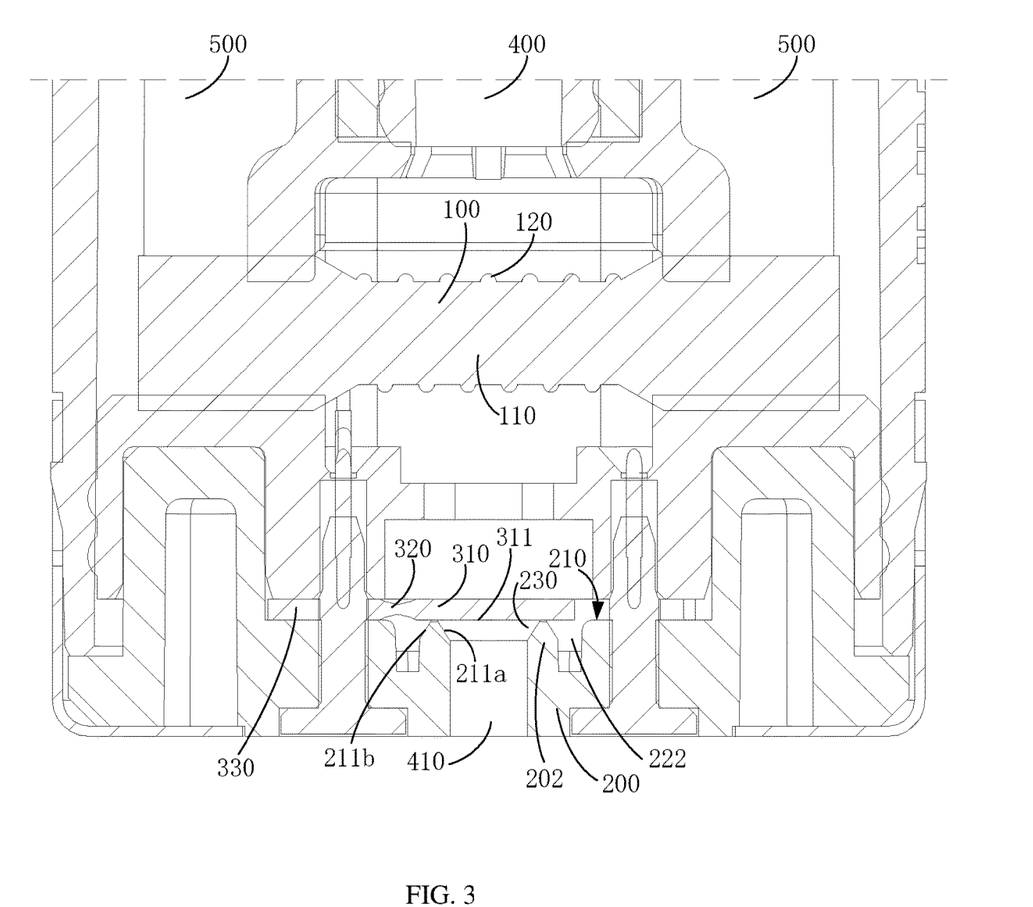
FIG. 3 is a planar cross-sectional view of the atomizer shown in FIG. 1 with a baffle covering an air inlet.

Referring to FIGS. 2 and 3, the atomizing core 100 is electrically connected to the power supply assembly through electrodes. The atomizing core 100 may include a porous ceramic body 110 and a heating wire 120. The porous ceramic body 110 is substantially in a columnar structure and is disposed transversely. The oil can be drawn from an oil storage cavity of the atomizer 10 through both ends of the porous ceramic body 110. The middle of the porous ceramic body 110 is located in the airflow channel 400, and the heating wire 120 is wound around the middle of the porous ceramic body 110, and obviously, the heating wire 120 is also located in the airflow channel 400. While the oil is wicked from the ends of the porous ceramic body 110 to the middle thereof by capillary action, the heating wire 120 generates heat and atomizes the oil to form smoke capable of being inhaled by the user.

Figure 4:
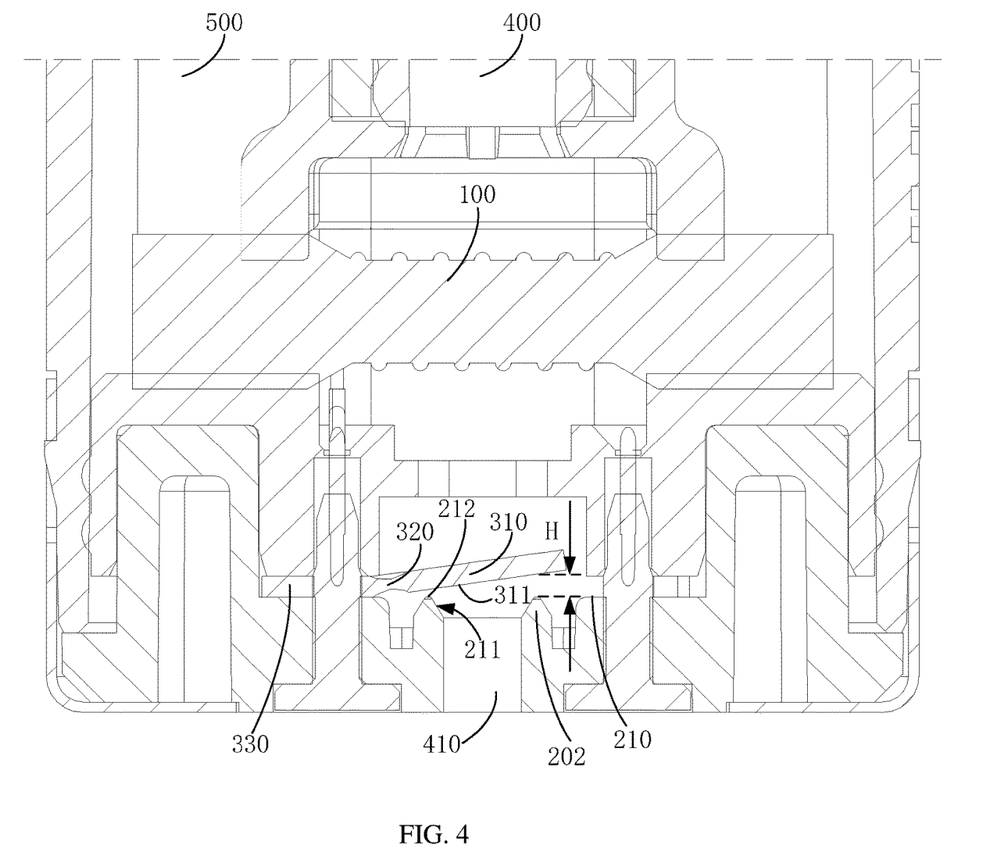
FIG. 4 is a planar cross-sectional view of the atomizer shown in FIG. 1 with the baffle opening the air inlet.

Referring to FIGS. 3 and 4, the base 200 is located at the bottom of the atomizer 10, and the airflow channel 400 includes an air inlet 410 located at a lower end thereof. The air inlet 410 is provided on the base 200, and the outside air can be input into the atomizer 10 through the air inlet 410. The base 200 has an upper surface 210 which is disposed facing the atomizing core 100. The one-way valve 300 includes a baffle 310 which is elastically connected to the base 200. The baffle 310 has a lower surface 311. Along an extending direction of the airflow channel 400, the baffle 310 is located between the base 200 and the atomizing core 100, that is, the baffle 310 is located below the atomizing core 100 and located above the base 200.

Under normal conditions such as transportation and storage, under the action of various resistances such as elastic force and gravity of the baffle 310, the baffle 310 is in a closed state, and the baffle 310 covers the air inlet 410. When the user inhales at the air outlet 420, an air pressure difference is formed between an upper side and a lower side of the baffle 310. The air pressure difference overcomes the resistances of the baffle 310 and moves the baffle 310 away from the air inlet 410. The baffle 310 is in an open state, allowing an airflow in the air inlet 410 to enter the air outlet 420 through other parts of the airflow channel 400. While the baffle 310 is in the closed state, the upper surface 210 of the base 200 and the lower surface 311 of the baffle 310 are disposed opposite to each other, meanwhile, the upper surface 210 and/or the lower surface 311 reduce a contact area between the baffle 310 and the base 200 by partially protruding or partially recessing.

Referring to FIGS. 3 and 4, along the extending direction of the airflow channel 400, while the air pressure difference between the upper and lower sides of the baffle 310 is less than a threshold pressure, the baffle 310 covers the air inlet 410. While the air pressure difference between the two opposite sides of the baffle 310 is greater than the threshold pressure, the baffle 310 opens the air inlet 410. For example, when the user inhales at the air outlet 420, an air pressure in the airflow channel 400 above the baffle 310 is lower than an air pressure in the airflow channel 400 below the baffle 310 (the air inlet 410), and an air pressure generated by the air pressure difference can overcome the resistances such as gravity and elastic force of the baffle 310 to drive the baffle 310 to move upward, such that the baffle 310 leaves the base 200 and opens the air inlet 410, thereby ensuring that the air in the air inlet 410 can enter the airflow channel 400 above the baffle 310 to carry smoke for the user to inhale. When the user stops inhaling at the air outlet 420, the air pressure in the airflow channel 400 above the baffle 310 and the air pressure in the airflow channel 400 below the baffle 310 (the air inlet 410) are both atmospheric pressure, thereby eliminating the air pressure difference acting on the baffle 310, the baffle 310 is again supported by the base 200 under the action of gravity and elastic force to cover the air inlet 410.

While the baffle 310 covers the air inlet 410, on one hand, the smoke cannot flow back to the power supply assembly through the air inlet 410, preventing a liquid condensate formed by cooling of the smoke from corroding the power supply assembly; on the other hand, oil overflowing from the atomizing core 100 can be blocked, preventing the oil from leaking from the air inlet 410 to the power supply assembly to cause corrosion. Of course, the lower surface 311 of the baffle 310 will also inevitably adhere with the liquid condensate formed by the smoke and the oil overflowing from the atomizing core 100. While the baffle 310 is in contact with the base 200, the liquid condensate and overflowing oil will adhere the baffle 310 and the base 200. If the contact area between the baffle 310 and the base 200 is large, there will be more liquid condensate and overflowing oil adhering between the baffle 310 and the base 200, such that an adhesive force between the baffle 310 and the base 200 is greater. While the suction force of the user is small, the air pressure difference formed on both sides of the baffle 310 will not be able to overcome gravity, elastic force and adhesive force to open the air inlet 410, causing the user to be unable to inhale the smoke. Therefore, the user must strongly inhale to form a large air pressure difference, such that the baffle 310 opens the air inlet 410 to allow the smoke to be inhaled smoothly. Therefore, while the contact area between the baffle 310 and the base 200 is large, the response sensitivity of the atomizer 10 to the inhalation of the user will be affected.

Figure 5:
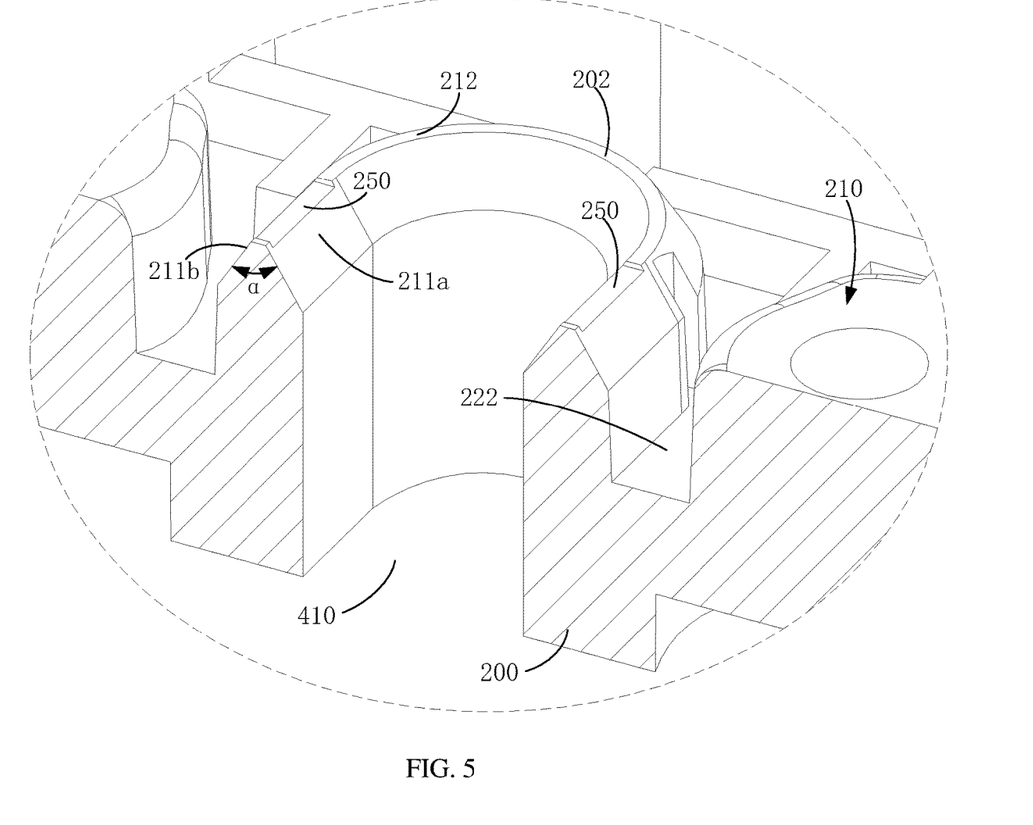
FIG. 5 is a partial perspective cross-sectional view of a base in the atomizer shown in FIG. 1 according to a first embodiment.
Figure 6:
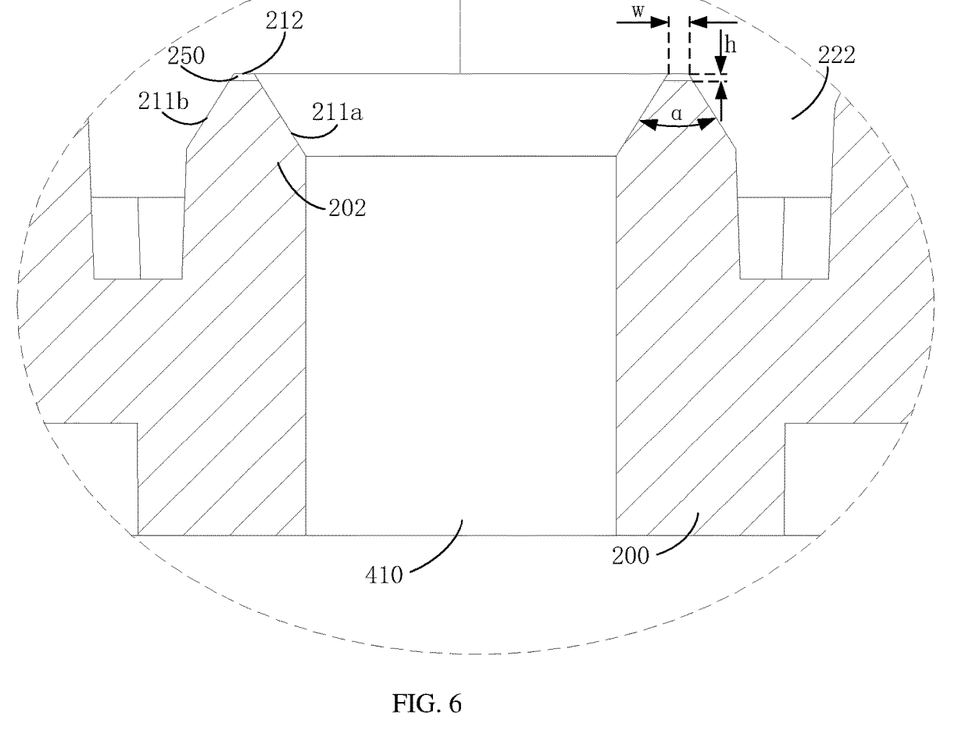
FIG. 6 is a partial planar cross-sectional view of the base in the atomizer shown in FIG. 1 according to the first embodiment.

In some embodiments, for example, referring to FIGS. 4, 5, and 6, the upper surface 210 of the base 200 is recessed with an annular groove 222. Through a cutting action of the annular groove 222, a part of the base 200 forms a support cylinder 202, the air inlet 410 passes through the support cylinder 202, and the baffle 310 can press against the support cylinder 202 to cover the air inlet 410. While the baffle 310 covers the air inlet 410, surfaces of the base 200 and the baffle 310 that are pressed against each other are both contact surfaces, that is, the contact surface of the base 200 and the contact surface of the baffle 310 are attached to each other, and the contact surface of the base 200 is denoted as a first contact surface 212, and the first contact surface 212 is located on the support cylinder 202.

Specifically, the support cylinder 202 has the first contact surface 212, a first separation surface 211a, and a second separation surface 211b. The first separation surface 211a defines a part of a boundary of the air inlet 410. The first contact surface 212 may have a racetrack shape, certainly, the first contact surface 212 may also have a ring shape or a rectangular shape. The first contact surface 212 is horizontally disposed, both the first separation surface 211a and the second separation surface 211b are obliquely disposed to form a certain included angle with the first contact surface 212. The first contact surface 212 is connected between upper ends of both the first separation surface 211a and the second separation surface 211b, and the first separation surface 211a and the second separation surface 211b are both located on a side (i.e., a lower side) of the first contact surface 212 away from the baffle 310, such that the first separation surface 211a, the second separation surface 211b, and the first contact surface 212 enclose a tapered structure. An included angle between the first separation surface 211a and the second separation surface 211b is a taper angle α of the tapered structure, and the taper angle α ranges from 20° to 135°, for example, the specific value of the taper angle α can be 20°, 100°, or 135°, etc. A width W of the first contact surface 212 ranges from 0.2 mm to 1 mm, and for example, the specific value of the width W may be 0.2 mm, 0.5 mm, or 1 mm, etc.

Referring to FIGS. 3 and 4, while the baffle 310 is supported by the base 200 to cover the air inlet 410, the baffle 310 is pressed against the first contact surface 212, that is, the lower surface 311 of the baffle 310 is adhered to the first contact surface 212. There is a gap 230 between the first separation surface 211a and the lower surface 311 of the baffle 310, and there is also a gap 230 between the second separation surface 211b and the lower surface 311 of the baffle 310, such that neither the first separation surface 211a nor the second separation surface 211b is in an attachment relationship with the lower surface 311 of the baffle 310. When the baffle 310 leaves the base 200 under the action of the air pressure difference to open the air inlet 410, the lower surface 311 of the baffle 310 leaves the first contact surface 212 to release the attachment relationship with the first contact surface 212.

In fact, if the upper surface 210 of the base 200 is not recessed downward to form the annular groove 222, it will inevitably make the baffle 310 and the base 200 have a larger contact area. By providing the annular groove 222 on the upper surface 210, the baffle 310 is attached to a surface of the support cylinder 202 facing the atomizing core 100, and the surface of the support cylinder 202 facing the atomizing core 100 can be regarded as a part of the upper surface 210. Therefore, even if the surface of the support cylinder 202 facing the atomizing core 100 is a horizontal surface, the contact area between the baffle 310 and the base 200 can be reduced by attaching the baffle 310 to the surface of the support cylinder 202 facing the atomizing core 100. Further, if both ends of the horizontal surface are recessed downward, the first separation surface 211a and the second separation surface 211b can be regarded as being formed by the two ends of the horizontal surface recessed downward, while the middle part of the horizontal surface is not recessed downward and still horizontally disposed, that is, the first contact surface 212 can be regarded as being formed by the middle part of the horizontal surface. While the baffle 310 covers the air inlet 410, neither the first separation surface 211a nor the second separation surface 211b is in an attachment relationship with the lower surface 311 of the baffle 310, and the lower surface 311 of the baffle 310 is only attached to the first contact surface 212, so that the contact area between the baffle 310 and the base 200 is further reduced, and the baffle 310 and the base 200 have a smaller adhesive force therebetween, ensuring that forming a small air pressure difference on both sides of the baffle 310 can overcome gravity, elastic force, and adhesive force and make the baffle 310 open the air inlet 410. Therefore, the user can inhale smoke with a smaller suction force. It prevents the feeling of being blocked or broken caused by the baffle 310 being difficult to detach from the base 200 due to an excessively small suction force, and ultimately improves the response sensitivity of the atomizer 10 to the inhalation of the user.

Figure 7:
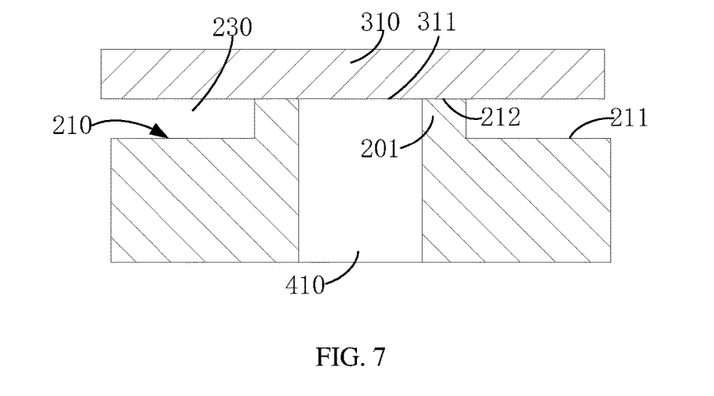
FIG. 7 is a partial cross-sectional view showing that a base in the atomizer shown in FIG. 1 according to a second embodiment is pressed to the baffle.
Figure 8:
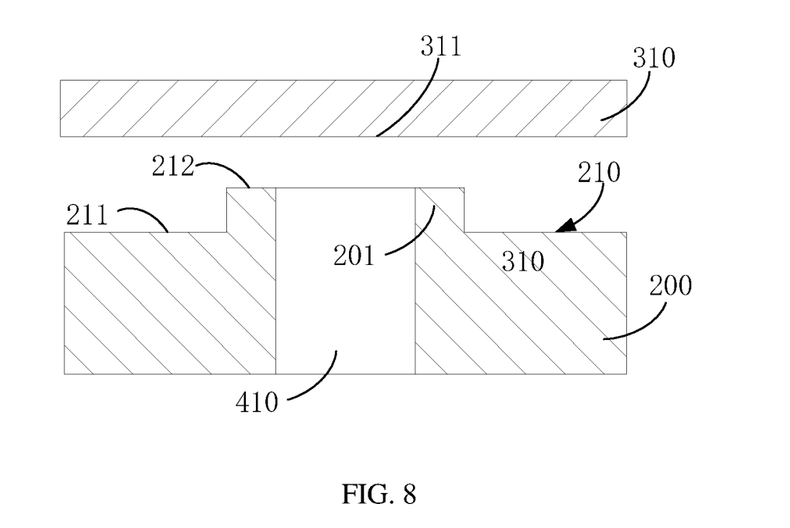
FIG. 8 is a partial cross-sectional view showing the base in the atomizer shown in FIG. 1 according to the second embodiment is separated from the baffle.

In another embodiment, referring to FIGS. 7 and 8, the upper surface 210 of the base 200 has a larger area, and the upper surface 210 is horizontally disposed. The base 200 includes a boss 201 which is disposed on the upper surface 210 and protrudes toward the atomizing core 100 by a predetermined height relative to the upper surface 210. While the baffle 310 covers the air inlet 410, the baffle 310 is attached to a surface of the boss 201 facing the atomizing core 100, and thus the surface of the boss 201 facing the atomizing core 100 is the contact surface 212. A part of the upper surface 210 where the boss 201 is not provided is the separation surface 211, and a gap 230 is formed between the separation surface 211 and the baffle 310, such that the baffle 310 cannot be attached to the separation surface 211. Therefore, while the boss 201 is provided on the upper surface 210, the entire upper surface 210 can be effectively prevented from being attached to the baffle 310, such that the baffle 310 is only attached to the contact surface 212 with a relatively small area on the boss 201. It can also reduce the attachment area and the adhesive force between the baffle 310 and the base 200, such that the user can inhale smoke with a small suction force, thereby improving the response sensitivity of the atomizer 10 to the inhalation of the user.

Figure 9:
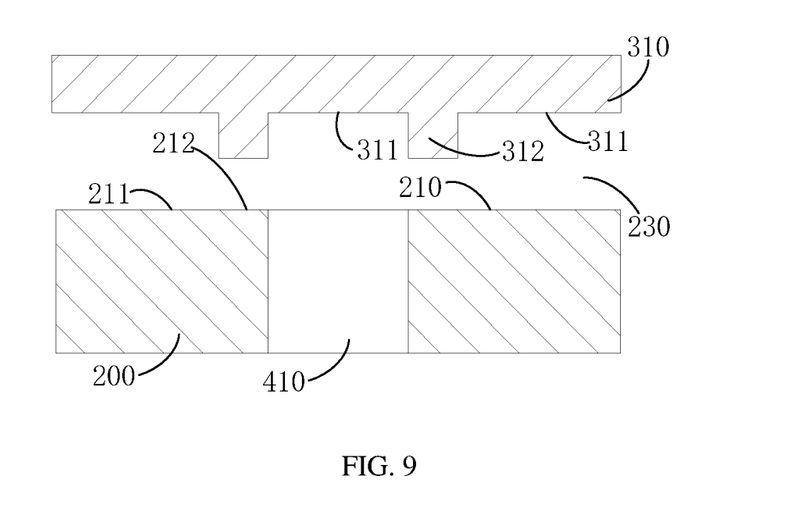
FIG. 9 is a partial cross-sectional view showing a base in the atomizer shown in FIG. 1 according to a third embodiment is separated from the baffle.

In yet another embodiment, referring to FIG. 9, the upper surface 210 of the base 200 has a larger area, and the upper surface 210 is horizontally disposed. The baffle 310 includes a protruding strip 312, which is disposed on the lower surface 311 and protrudes toward the base 200 by a predetermined length relative to the lower surface 311. While the baffle 310 covers the air inlet 410, a part where the upper surface 210 is attached to the protruding strip 312 is the contact surface 212, and a part on the upper surface 210 that is not pressed against the protruding strip 312 is the separation surface 211, and a gap 230 is formed between the separation surface 211 and a part on the lower surface 311 where the protruding strip 312 is not provided. Therefore, while the lower surface 311 of the baffle 310 has the protruding strips 312, the entire upper surface 210 can also be prevented from being attached to the baffle 310, such that the baffle 310 is only attached to the contact surface 212 with a relatively small area. It reduces the attachment area and adhesive force between the baffle 310 and the base 200, such that the user can inhale smoke with a small suction force, thereby improving the response sensitivity of the atomizer 10 to the inhalation of the user.

Figure 10:
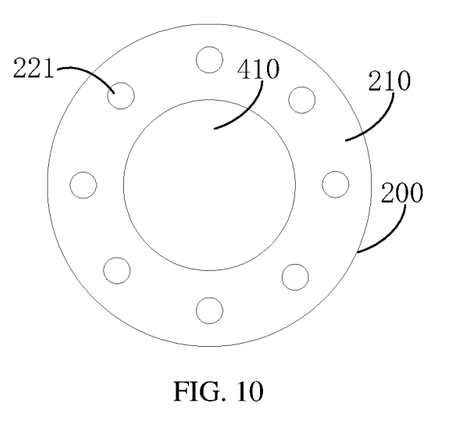
FIG. 10 is a partial top view of a base in the atomizer shown in FIG. 1 according to a fourth embodiment.

In some embodiments, referring to FIG. 10, the upper surface 210 of the base 200 is a horizontal surface, and a part of the upper surface 210 is recessed downward to form counterbores 221. There are a plurality of counterbores 221 and the counterbores 221 can be evenly distributed at intervals along a circumferential direction of the air inlet 410. While the baffle 310 is pressed against the base 200, a part of the upper surface 210 that is not recessed is attached to the baffle 310, ensuring that only a part of the upper surface 210 is eventually form an actual attachment relationship with the baffle 310. In this way, the attachment area and adhesive force between the baffle 310 and the base 200 can also be reduced, such that the user can inhale smoke through a small suction force, thereby improving the response sensitivity of the atomizer 10 to the inhalation of the user. Certainly, the counterbores 221 can also be provided on the lower surface 311 of the baffle 310.

Figure 11:
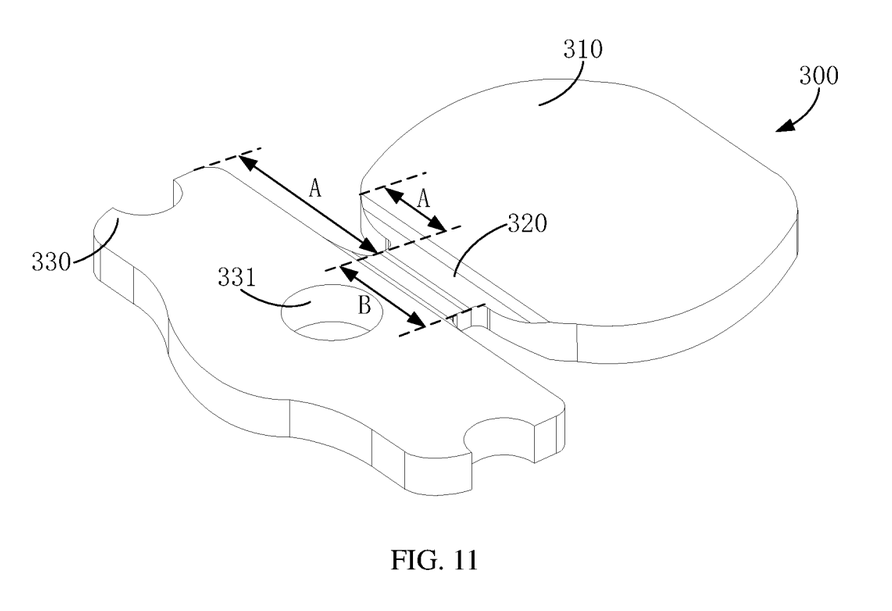
FIG. 11 is a perspective view of the baffle of the atomizer shown in FIG. 1.
Figure 12:
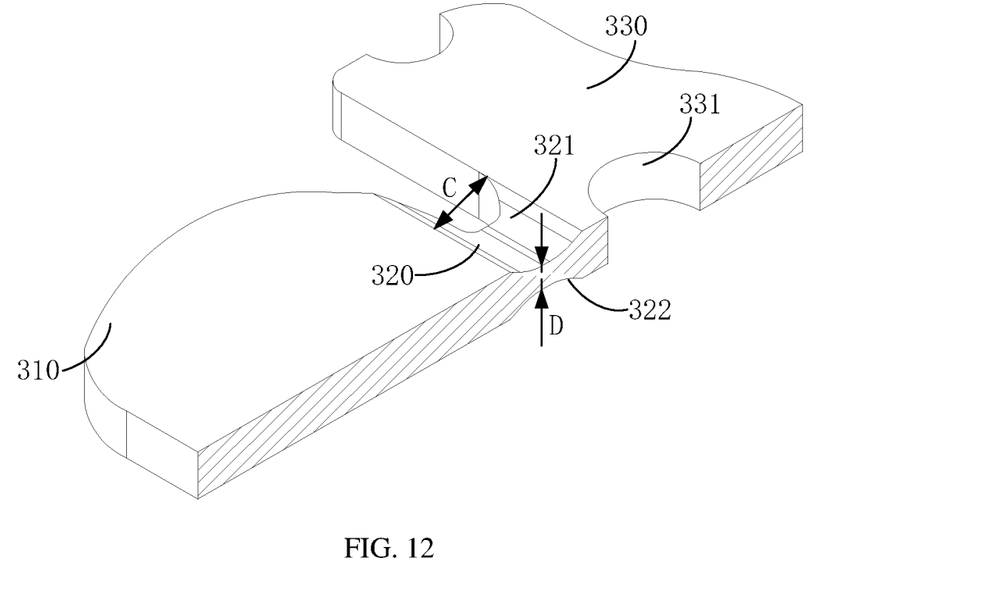
FIG. 12 is a perspective cross-sectional view of the baffle shown in FIG. 11.

In some embodiments, referring to FIGS. 11 and 12, in addition to the baffle 310, the one-way valve 300 may further include a fixed end 330 and an elastic arm 320. The fixed end 330 is provided with a through hole 331 extending along a thickness direction of the fixed end 330, and the fixed end 330 can be mounted on the base 200 through the through hole 331. The elastic arm 320 is connected between the fixed end 330 and the baffle 310, and the baffle 310 can swing up and down relative to the fixed end 330 following the elastic arm 320. The entire one-way valve 300 can be integrally formed, and the one-way valve 300 can be made of elastic plastic materials.

Comparing to the baffle 310 and the fixed end 330, a thickness D of the elastic arm 320 is the smallest, and the thickness D of the elastic arm 320 is 0.1 mm to 0.8 mm. For example, a specific value of the thickness can be 0.1 mm, 0.5 mm, or 0.8 mm, etc. A length C of the elastic arm 320 is 0.02 mm to 2 mm. For example, a specific value of the length C can be 0.02 mm, 1 mm, or 2 mm, etc. A width B of the elastic arm 320 is 0.5 mm to 3 mm. For example, a specific value of the width B can be 0.5 mm, 2 mm, or 3 mm, etc. The elastic arm 320 has a first curved surface 321 and a second curved surface 322 with opposite bending directions. The first curved surface 321 is an upper surface of the elastic arm 320 and the bending direction is upward, and the second curved surface 322 is a lower surface of the elastic arm 320 and the bending direction is downward, and a distance between the first curved surface 321 and the second curved surface 322 decreases from an edge part of the elastic arm 320 to a middle part thereof. Along a width direction of the elastic arm 320, an edge of the elastic arm 320 is spaced at a predetermined distance A from an edge of the fixed end 330 and an edge of the baffle 310, respectively, such that two structures similar to U-shaped groove are formed on the entire one-way valve 300.

With the above provision of the one-way valve 300, while the air pressure difference acts on the baffle 310, the elastic arm 320 can be easily deformed, that is, an elastic force generated by the baffle 310 in the process of opening the air inlet 410 is reduced, such that the baffle 310 can be separated from the base 200 under the action of a small air pressure difference to open the air inlet 410, which ultimately reduces the suction force of the user and improves the response sensitivity of the atomizer 10 to the inhalation of the user.

In some embodiments, referring to FIGS. 3, 4, and 5, since all of the first contact surface 212 can be attached to the baffle 310, in this case, the contact surface of the baffle 310 and/or the first contact surface 212 of the base 200 may also be provided with a cavity 250, and the cavity 250 is covered between the base 200 and the baffle 310 and is in communication with the air inlet 410. Certainly, while the cavity 250 is provided on the baffle 310, at least a part of an orthographic projection of the cavity 250 relative to the base 200 falls on the first contact surface 212. A depth dimension h of the cavity 250 is 0.01 mm to 0.5 mm. For example, the depth dimension h may be 0.01 mm, 0.4 mm, 0.5 mm, etc. A cross-sectional profile of the cavity 250 is circular, polygonal, elliptical, or the like.

While the cavity 250 in communication with the air inlet 410 is continuously provided on the first contact surface 212, the cavity 250 functions as a notch. At the notch formed by the cavity 250, the part of the baffle 310 corresponding to the cavity 250 does not form an actual attachment relationship with the base 200, such that no adhesive force is formed between the part of the baffle 310 adhered with the liquid condensate and overflowing oil and the base 200. Therefore, a resistance that the baffle 310 overcomes to open the air inlet is substantially composed of gravity, elastic force, and adhesive force under the action of the air pressure difference, the baffle 310 is more easily detached from the base 200 while the adhesive force is reduced or eliminated under the condition that the gravity and the elastic force are the same.

In view of the fact that no adhesive force is formed between the part of the baffle 310 corresponding to the cavity 250 and the base 200, and the cavity 250 is in communication with the air inlet 410, the air pressure difference will be directly applied to the part of the baffle 310. For the entire baffle 310, the part of the baffle 310 corresponding to the cavity 250 is easier to detach from the base 200 than other parts of the baffle 310 that are actually attached to the base 200, such that the part of the baffle 310 forms a stress weak point, and in turn the entire baffle 310 is first detached from the base 200 near the stress weak point and forms a "tear gap" with the base 200. When the outside air enters the "tear gap" through the air inlet 410, the adhesive force between the liquid condensate and the overflowing oil can be further greatly weakened, such that the "tear gap" is rapidly expanded to correspond to the other parts of the baffle 310. Finally, the resistance that the entire baffle 310 overcomes to leave the base 200 is reduced, and it can be ensured that the baffle 310 can be quickly detached from the base 200 under a small air pressure difference. It prevents the feeling of being blocked or broken caused by the baffle 310 being difficult to detach from the base 200 due to an excessively small suction force, and ultimately improves the response sensitivity of the atomizer 10 to the inhalation of the user.

Certainly, while the cavities 250 are formed on both the contact surface of the baffle 310 and the first contact surface 212 of the base 200, referring to the above-mentioned case of providing the cavity 250 on the first contact surface 212 of the base 200, the stress weak point can also be formed, so as to eliminate the feeling of being blocked or broken, and to improve the response sensitivity of the atomizer 10 to the inhalation of the user. In order to form a plurality of stress weak points and further reduce the resistance that the baffle 310 overcomes to leave the base 200, there may be a plurality of cavities 250 which are disposed at intervals along the circumferential direction of the air inlet 410.

In the above mentioned embodiment in which the support cylinder 202 has the first contact surface 212, the first separation surface 211a, and the second separation surface 211b, the first contact surface 212 is provided with two cavities 250, and the cavities 250 may only extend through the first separation surface 211a to be in communication with the air inlet 410. While reducing a contact area between the baffle 310 and the base 200, a stress weak point can also be formed between the baffle 310 and the base 200, and thus the resistance that the baffle 310 overcomes to leave the base 200 is further reduced. Certainly, the cavities 250 may further extend through the second separation surface 211b to be in communication with the annular groove 222. That is, the cavities 250 are in communication with both the air inlet 410 and the annular groove 222, such that the cavities 250 have a cutting effect on the first contact surface 212. Therefore, the first contact surface 212 is prevented from being closed along the circumferential direction of the air inlet 410 to form a continuous ring, which can further reduce the contact area between the baffle 310 and the base 200, and further reduce the adhesive force at the stress weak point.

In some embodiments, the contact surface of the baffle 310 and/or the contact surface of the base 200 is a non-smooth rough surface, and the contact surface has a roughness Ra greater than or equal to 1.6 μm. Due to the uneven micropores or texture structures formed on the rough contact surface, the attachment area between the baffle 310 and the base 200 can be further reduced, and meanwhile, the stress weak point can be formed between the baffle 310 and the base 200, so that the resistance that the baffle 310 overcomes to leave the base 200 is reduced to the maximum extent.

In some embodiments, the contact area between the baffle 310 and the base 200 is reduced, and the contact surface 212 is provided with the cavity 250 thereon to form the stress weak point. Meanwhile, the structure of the one-way valve 300 is designed to reduce the elastic force generated when the baffle 310 leaves the base 200. That is, the above-mentioned various measures can reduce the resistance that the baffle 310 overcomes to open the air inlet 410, and ultimately reduce the threshold pressure corresponding to the baffle 310 opening the air inlet 410. For example, the threshold pressure ranges from 10 Pa to 100 Pa, and the threshold pressure ranges preferably from 30 Pa to 70 Pa. A specific value of the threshold pressure can be 30 Pa, 40 Pa, 70 Pa, or the like. In a case where the threshold pressure is provided as 30 Pa to 70 Pa, while the air pressure difference is only about 70 Pa, the baffle 310 can rapidly open the air inlet 410, and the user does not need to strongly inhale to form a large air pressure difference. Therefore, the feeling of being blocked or broken generated by the baffle 310 being difficult to detach from the base 200 due to an excessively small suction force is prevented, and the response sensitivity of the atomizer 10 to the inhalation of the user is improved.

After the baffle 310 fully opens the air inlet 410, a maximum distance H between the baffle 310 and the contact surface 212 is 0.3 mm to 1.5 mm, and a specific value of the maximum distance H can be 0.3 mm, 1 mm, or 1.5 mm, or the like. By setting the above-mentioned maximum distance H, the gas of the air inlet 410 can enter the airflow channel 400 above the baffle 310 through a space corresponding to the maximum distance H, so as to ensure that there is sufficient outside air to carry smoke for the user to inhale, and to satisfy the requirements of the user for different inhalation amounts.

The technical features of the above-mentioned embodiments can be combined arbitrarily. In order to make the description concise, possible combinations of the various technical features in the above-mentioned embodiments are not all described. However, as long as there is no contradiction in the combinations of these technical features, all should be considered as the scope of this specification.

The above-mentioned embodiments only express several embodiments of the present disclosure, and the descriptions are relatively specific and detailed, but they should not be interpreted as limiting the scope of the disclosure. It should be pointed out that for those of ordinary skill in the art, without departing from the concept of the present disclosure, several modifications and improvements can be made, and these all fall within the protection scope of the present disclosure. Therefore, the protection scope of the present disclosure should be subject to the appended claims.

What is claimed is:

1. An atomizer, comprising:
    an airflow channel, comprising an air inlet and an air outlet;
    an atomizing core, at least a part of the atomizing core being located in the airflow channel;
    a base, wherein the air inlet extends through the base; and
    a one-way valve, comprising a baffle elastically connected to the base; wherein the baffle has a closed state and an open state; under normal conditions, the baffle is in the closed state, and the baffle covers the air inlet; upon inhaling at the air outlet, the baffle is in the open state to allow airflow to pass through;
    wherein the base has a base upper surface, and the baffle has a baffle lower surface; while the baffle is in the closed state, the base upper surface is opposite to the baffle lower surface; the base upper surface and/or the baffle lower surface reduce a contact area between the baffle and the base by partially protruding or partially recessing, the one-way valve further comprising a fixed end and an elastic arm, the elastic arm being connected between the fixed end and the baffle, the fixed end being fixedly connected to the base, and the baffle being capable of swinging relative to the fixed end following the elastic arm.

2. The atomizer of claim 1, wherein the partially recessing is a cavity; while the baffle is in the closed state, surfaces on which the base and the baffle press against each other are contact surfaces, at least a part of the cavity is located on the contact surfaces, and the cavity is in communication with the air inlet to form a stress weak point.

3. The atomizer of claim 2, wherein the cavity cuts off the contact surface of the base and/or the contact surface of the baffle to prevent the contact surfaces from being closed along a circumferential direction of the air inlet to form a continuous ring.

4. The atomizer of claim 2, wherein a surface of the base facing the atomizing core is recessed to form an annular groove, such that a part of the base forms a support cylinder, the air inlet extends through the support cylinder, the contact surface of the base is a first contact surface, the first contact surface is located in the support cylinder, and the cavity is formed on the first contact surface.

5. The atomizer of claim 4, wherein the support cylinder further has a first separation surface and a second separation surface, the first contact surface is connected between the first separation surface and the second separation surface, the first separation surface and the second separation surface together form a predetermined taper angle and are both located on a side of the first contact surface away from the baffle; while the baffle covers the air inlet, the first contact surface is pressed against the baffle, and both the first separation surface and the second separation surface are spaced apart from the baffle.

6. The atomizer of claim 5, wherein the taper angle ranges from 20° to 135°, and the first contact surface has a width ranging from 0.2 mm to 1 mm.

7. The atomizer of claim 5, wherein the cavity extends through both the first separation surface and the second separation surface to be in communication with the annular groove and the air inlet.

8. The atomizer of claim 2, wherein the contact surface is a rough surface and has a roughness greater than or equal to 1.6 μm.

9. The atomizer of claim 2, wherein the cavity has a depth dimension of 0.01 mm to 0.5 mm.

10. The atomizer of claim 2, wherein the cavity has a cross-sectional profile of circular, polygonal, or elliptical; and the contact surfaces are circular, racetrack-shaped, or rectangular.

11. The atomizer of claim 2, wherein there are a plurality of cavities, and the plurality of cavities are distributed at intervals along circumferential direction of the air inlet.

12. The atomizer of claim 1, wherein the elastic arm has a first curved surface and a second curved surface having opposite bending directions, and a distance between the first curved surface and the second curved surface decreases from an edge part of the elastic arm to a middle part of the elastic arm.

13. The atomizer of claim 1, wherein a thickness of the elastic arm is the smallest relative to the fixed end and the baffle.

14. The atomizer of claim 1, wherein the elastic arm has a thickness of 0.1 mm to 0.8 mm, the elastic arm has a length of 0.02 mm to 2 mm, and the elastic arm has a width of 0.5 mm to 3 mm.

15. The atomizer of claim 1, wherein along a width direction of the elastic arm, an edge of the elastic arm is spaced at a predetermined distance from an edge of the fixed end and an edge of the baffle, respectively.

16. The atomizer of claim 1, wherein the fixed end is provided with a through hole extending in a thickness direction of the fixed end, and the through hole is configured for mounting of the fixed end.

17. The atomizer of claim 1, wherein when the baffle opens the air inlet, a maximum distance between the baffle and the contact surface is 0.3 mm to 1.5 mm.

18. The atomizer of claim 1, wherein the base comprises a boss disposed on the base upper surface and protruding relative to the base upper surface; while the baffle covers the air inlet, a surface of the boss facing the atomizing core is a contact surface pressed against the baffle lower surface of the baffle, the baffle lower surface is spaced apart from a part of the base upper surface where the boss is not disposed.

19. The atomizer of claim 1, wherein the baffle comprises a protruding strip disposed on the baffle lower surface and protruding relative to the baffle lower surface; while the baffle covers the air inlet, a part of the base upper surface is a contact surface pressed against the protruding strip, and another part of the base upper surface is spaced apart from the baffle lower surface.

20. The atomizer of claim 1, wherein surfaces of the base and the baffle that are pressed against each other are both contact surfaces, the contact surfaces are recessed to form counterbores.

21. An electronic atomization device, comprising a power supply assembly and the atomizer according to claim 1, and the power supply assembly is provided with a receiving cavity capable of receiving the atomizer.

* * * * *